Patented Mar. 1, 1938

2,109,941

UNITED STATES PATENT OFFICE 2,109,941

PREPARATION OF AMIDES

Gaetano Francis D'Alelio, Dorchester, Mass., and Ebenezer Emmet Reid, Baltimore, Md., assignors, by direct and mesne assignments, to E. I. du Pont de Nemours & Company, Wilmington, Del., a corporation of Delaware No Drawing. Application June 5, 1936, Serial No. 83,806

10 Claims. (Cl. 260—124)

This invention relates to acid amides, more particularly to a new and improved process for the preparation of aliphatic carboxylic acid amides, and still more particularly to improvements in the preparation thereof from ureas.

Amides of aliphatic carboxylic acids are commonly made by reacting ammonia, a primary amine or a secondary amine with the desired carboxylic acid or an amide-forming derivative thereof such as the acid chloride, the acid anhydride or an ester of the acid with a volatile alcohol. More recent processes (U. S. Patent 1,989,968 and British Patent 418,247) for the manufacture of higher fatty acid amides consist in heating the free fatty acid with an excess of urea (one or more mols of urea per mol. of fatty acid) at temperatures of at least 160° C. and preferably within the range of 180°–250° C. These methods, however, have not been altogether satisfactory because they are expensive or because of low yields. In the case of amides prepared from higher fatty acids, the yields have been especially poor. The processes of U. S. Patent 1,989,968 and British Patent 418,247 give rise to the formation of by-products other than amides and, hence, the reaction products require purification to obtain the pure amide.

It is also known to react urea with certain polycarboxylic acids, such as succinic and phthalic (Science Reports 2, 241–243, and Zeit. f. ang. Chem. 32, 301), but in these instances the imide is produced in preference to the amide. It is possible that the amide is formed as an intermediate compound and, being unstable under reaction conditions, is converted immediately to the imide; but it has not been known heretofore to prepare any polycarboxylic acid amide from the acid and a urea, and to isolate same.

For the purposes of the present description, "aliphatic carboxylic acid" is intended to mean an acid in which the carboxyl groups are attached to carbon atoms which are aliphatic in character, i. e., are not a part of an aromatic ring.

It is an object of the present invention to provide a process for the preparation of aliphatic monocarboxylic acid amides from urea in improved yields and a high degree of purity. A further object is to provide a new and improved process for preparing amides of certain aliphatic carboxylic acids in which one or both amidohydrogen atoms are replaced by substituent groups. A further object is the preparation of amides and substituted amides of certain aliphatic polycarboxylic acids which have heretofore been obtainable only by different and more difficult processes. Still another object is the production of new and useful acid amides of certain aliphatic carboxylic acids. Other objects will appear hereinafter.

These objects are accomplished in accordance with this invention by reacting an acid of the formula $R(COOH)_x$, wherein $x$ is an integer and R represents a hydrocarbon radical in which at least the terminal carbon atoms are aliphatic, with a urea, in an amount not substantially greater than $0.6x$ mols of urea per mol. of the acid, said acid being one whose amide is stable under reaction conditions. So far as is known, the amides of all monocarboxylic acids of this formula are stable under the temperatures necessary for their formation from urea. However, of the amides of polycarboxylic acids having this formula, those derived from acids having less than three carbon atoms between the acid groups are generally unstable, being readily converted to the imide under reaction temperatures. Such acids accordingly are not suitable for use in the present process.

Whereas the previously described processes involving the reaction of a urea with a monocarboxylic acid indicate that at least one mol. of urea per mol. of monocarboxylic acid and preferably a molecular excess should be employed, and that the lower temperature limit is around 160° C. and preferably above 180° C., it has now been found in accordance with this invention that much higher yields and substantially pure products may be obtained directly by using approximately 0.5 mol. of urea per mol. of the aliphatic monocarboxylic acid, and by operating at temperatures preferably not exceeding 160° C. Furthermore, while previous processes have indicated the non-applicability of the reaction of urea with aliphatic dicarboxylic acids to produce diamides, it has been found that the present process will produce diamides, in many instances in practically theoretical yields, if dicarboxylic acids whose amides are stable at reaction temperatures are used.

The reaction may be simply effected by heating the carboxylic acid and urea under atmospheric or super-atmospheric pressure, care being taken when volatile reactants are used to avoid loss by volatilization. It is convenient to distill off the lower amides directly from the reaction mixture and to recrystallize the higher amides from a suitable solvent, such as methyl alcohol. The resulting products are substantially pure. In some cases, depending upon the degree of purity desired, the reaction mixture can be used, e. g., as an intermediate in other processes, without distillation or purification since it is not discolored and since, other than small amounts of unchanged reactants, it contains practically nothing except the desired amides or mixtures of amides.

Table I shows the results obtained by reacting various aliphatic monocarboxylic acids with different ureas, the amide obtained being crystallized from a suitable organic solvent, such as methanol. Table II shows results secured with various polycarboxylic acids.

carbon atom" meaning a carbon atom which is attached to a carboxyl group. In the case of

*Table I*

| Acid employed | Urea employed | Mol. ratio acid: urea | Conditions | Amide obtained | M. P. °C. | Percent yield |
|---|---|---|---|---|---|---|
| Acetic (glacial) | Urea | 1:0.5 | 4–5 hrs. at 160° C | $CH_3CONH_2$ | 82 | 97 |
| Propionic (tech.) | Urea | 1:0.5 | 4–5 hrs. at 160° C | $C_2H_5CONH_2$ | 79 | 87 |
| n-Butyric (tech.) | Urea | 1:0.5 | 4–5 hrs. at 160° C | $C_3H_7CONH_2$ | 115 | 81 |
| n-Heptoic (tech.) | Urea | 1:0.5 | 4–5 hrs. at 160° C | $C_6H_{13}CONH_2$ | 94.5 | 80 |
| Palmitic (pure) | Urea | 1:0.5 | 4–5 hrs. at 160° C | $C_{15}H_{31}CONH_2$ | 104 | 97 |
| Stearic (pure) | Urea | 1:0.5 | 4–5 hrs. at 160° C | $C_{17}H_{35}CONH_2$ | 108-9 | 92 |
| n-Heptenoic | Urea | 1:0.5 | 4–5 hrs. at 160° C | $C_6H_{11}CONH_2$ | | 92 |
| β-phenylpropionic | Urea | 1:0.5 | 4–5 hrs. at 160° C | $C_6H_5CH_2CH_2CONH_2$ | | 86 |
| Ethylthioglycollic | Urea | 1:0.5 | 4–5 hrs. at 160° C | $C_2H_5SCH_2CONH_2$ | | 93 |
| Acetic (glacial) | Thiourea | 1:0.61 | 4–5 hrs. at 160° C | $CH_3CONH_2$ | 82 | 82 |
| Capric | s-Dimethylurea | 1:0.59 | 4–5 hrs. at 160° C | $C_9H_{19}CONHCH_3$ | 57 | 85 |
| n-Undecylic | s-Dimethylurea | 1:0.62 | 4–5 hrs. at 160° C | $C_{10}H_{21}CONHCH_3$ | 56 | 87 |
| Palmitic | unsym-Dimethylurea | 1:0.51 | 4 hrs. at 160° C | $C_{15}H_{31}CONH_2$ $C_{15}H_{31}CON(CH_3)_2$ | 104 | 32 35 |
| Palmitic | Monomethylurea | 1:0.52 | 4 hrs. at 160° C | $C_{15}H_{31}CONH_2$ $C_{15}H_{31}CONHCH_3$ | 104 85.4 | 36 38 |
| Acetic | Monophenylurea | 1:0.5 | 4 hrs. at 160° C | $CH_3CONH_2$ $CH_3CONH(C_6H_5)$ | 82 | 33 30 |
| Stearic | Monophenylurea | 1:0.5 | 4 hrs. at 160° C | $C_{17}H_{35}CONH_2$ $C_{17}H_{35}CONH(C_6H_5)$ | 108-9 | 48 50 |
| Stearic | Monophenylthiourea | 1:0.5 | 4 hrs. at 160° C | $C_{17}H_{35}CONH_2$ $C_{17}H_{35}CONH(C_6H_5)$ | 108-9 | 46 42 |
| Acetic | s-Diphenylthiourea | 1:0.5 | 4 hrs. at 160° C | $CH_3CONH(C_6H_5)$ | | 88 |
| Stearic | s-Diphenylthiourea | 1:0.5 | 4 hrs. at 160° C | $C_{17}H_{35}CONH(C_6H_5)$ | | 91 |
| Acetic | unsym-Methylphenylurea | 1:0.5 | 4 hrs. at 160° C | $CH_3CONHCH_3$ $CH_3CONH(C_6H_5)$ | | 30 50 |
| Stearic | unsym-Methylphenylurea | 1:0.5 | 4 hrs. at 160° C | $C_{17}H_{35}CONHCH_3$ $C_{17}H_{35}CONHC_6H_5$ | | 46 41 |

*Table II*

| Acid employed | Urea employed | Mol. ratio acid: urea | Conditions | Amide obtained | M. P. °C. | Percent yield |
|---|---|---|---|---|---|---|
| Glutaric | Urea | 1:1.006 | 6 hrs. at 170–180° C | $(CH_2)_3(CONH_2)_2$ | 174.8 | 80 |
| Adipic | Urea | 1:1.000 | 6 hrs. at 170–180° C | $(CH_2)_4(CONH_2)_2$ | 223.5 | 91 |
| Pimelic | Urea | 1:1.004 | 6 hrs. at 170–180° C | $(CH_2)_5(CONH_2)_2$ | 183.8 | 99 |
| Azelaic | Urea | 1:1.100 | 6 hrs. at 170–180° C | $(CH_2)_7(CONH_2)_2$ | 176.3 | 88 |
| Sebacic | Urea | 1:1.180 | 6 hrs. at 170–180° C | $(CH_2)_8(CONH_2)_2$ | 207.4 | 85 |
| Nonanedicarboxylic | Urea | 1:1.080 | 6 hrs. at 170–180° C | $(CH_2)_9(CONH_2)_2$ | 171.2 | 85 |
| Decanedicarboxylic | Urea | 1:1.20 | 6 hrs. at 170–180° C | $(CH_2)_{10}(CONH_2)_2$ | 187.6 | 98 |
| Succinic | Urea | 1:1.26 | 15 min. at 150° C | $(CH_2)_2(CONH_2)_2$ | | 6 |
| Succinic | Urea | 1:1.2 | 6 hrs. at 170–180° C | None* | | |

*Only succinimide obtained.

In practicing the invention, any carboxylic acid may be employed whose amide is stable at reaction temperatures and which has the general formula $R(COOH)_x$ wherein $x$ is an integer and R is a hydrocarbon radical having aliphatic terminal carbon atoms, the expression "terminal monocarboxylic acids, the invention is especially applicable to the preparation of the amides of saturated acids, particularly the fatty acids containing from eight to eighteen carbon atoms and mixtures thereof obtained, for example, from the hydrolysis of saturated animal and vegetable fats, oils and waxes such as coconut oil, beef tallow, and the like. In the case of polycarboxylic acids, the invention finds its greatest advantage in the preparation of amides of dicarboxylic acids of the general formula HOOC(CH₂)ₙCOOH, where $n$ is at least 3. In addition to these preferred types of mono- and polycarboxylic acids, other acids may be used such as p-phenylenediacetic acid, tricarballylic acid, and unsaturated monocarboxylic acids such as crotonic acid, linoleic acid, oleic acid, and even polymerizable acids such as acrylic acid, alpha-methacrylic acid, and homologues thereof. When the latter are used, however, it is preferable to have present in the reaction mixture a polymerization inhibitor such as hydroquinone or phenylenediamine in order to prevent the formation, by cross-linking of two or more molecules, of a polycarboxylic acid whose amide is unstable and decomposes to the imide.

The expression "a urea" as used herein is intended to include not only urea itself but, also, thiourea and N-substituted ureas and thioureas. The substituted ureas may have one or more hydrogen atoms replaced by substituent groups and, if the latter, these groups may be attached to the same nitrogen atom, or to different nitrogen atoms. The substituent group may be any monovalent hydrocarbon radical such as an aryl, aralkyl, alkyl or cycloalkyl radical. Double ureas may be used. As examples of suitable ureas may be mentioned s-dimethylurea, s-diethylurea, and higher homologues thereof; unsym-dimethylurea, unsym-diethylurea, and higher homologues thereof; methylurea, ethylurea, and higher homologues thereof; phenylurea, tolylurea, xylylureas, naphthylureas, and homologues thereof; phenylthiourea, p-tolylthiourea, s-diphenylthiourea, naphthylthiourea, and homologues thereof; unsym-phenylmethylurea, unsym-phenylethylurea, unsym-phenylmethylthiourea, unsym-phenylethylthiourea, and homologues thereof; benzylurea, s-dibenzylurea, cyclohexylurea, and the corresponding thioureas; and double ureas of the type

H₂NCONHCH₂CH₂NHCONH₂ which form, with monocarboxylic acids, amides of the type RCONHCH₂CH₂NHCOR, R being a hydrocarbon radical. Ureas which melt only at very high temperatures (e. g., s-diphenylurea of M. P. 235° C.) and ureas which volatilize or decompose readily (e. g., tetramethylurea) are generally to be avoided, though they can be employed with some success by properly adjusting the temperature or carrying out the reaction in the presence of a solvent such as ethylene and diethylene glycols, xylene, diphenyl and, in general, alcohols and aromatic hydrocarbons. Such solvents may be employed in the case of any urea, but there is generally no particular advantage in doing so, the reactions ordinarily proceeding smoothly and in a readily controllable manner when the reactants are simply heated together with suitable mixing.

As previously stated, the amount of the urea should not be substantially greater than 0.6 mol. per mol. of a monocarboxylic acid, not substantially greater than 1.2 mols for each mol. of a dicarboxylic acid, not greater than 1.8 mols for each mol. of a tricarboxylic acid, etc., or in other words not substantially greater than 0.6 mol. per carboxyl group. The preferred amount of urea is around 0.5 mol. per carboxyl group. The use of amounts not substantially in excess of this figure appears to be especially advantageous in the preparation of amides from urea and thiourea. With substituted ureas, as, for instance, s-dimethylurea, somewhat higher ratios of urea to acid do not appear substantially to decrease the yields, but it is uneconomical and unnecessary to use higher ratios unless the acid is the more expensive of the two reactants.

The temperature of the reaction preferably should not greatly exceed the decomposition temperature of the urea. The temperature may vary, however, with the particular reactants. Lower temperatures, preferably not in excess of 160° C., are especially desirable in the preparation of monocarboxylic acid amides. The reactions which are carried out in accordance with the invention may begin at temperatures as low as 130° C., although such temperatures are too low for practical purposes. With polycarboxylic acids temperatures in the neighborhood of 170-180° C. are preferred. Much higher temperatures are not usually necessary and tend to produce charring of the products.

The amides prepared in accordance with the invention are useful as intermediates in the preparation of amines, plasticizers, dispersing agents, antioxidants for rubber and oils, rubber accelerators, and nitriles having the same number of carbon atoms as the amides. The higher amides are particularly useful as intermediates in the preparation of the higher aliphatic amines, e. g., laurylamine, which are good wetting agents and detergents. The mono- and di-substituted N-alkylamides of the higher fatty acids in themselves are also useful as detergents and wetting agents.

The process described herein provides a method of preparing amides of certain carboxylic acids simply and directly and in higher yields than are obtainable in accordance with previous processes. In many cases, practically theoretical yields are obtained while in the prior art yields of no higher than 50-60% of theory are obtained, and in the case of the high molecular weight acids, they are considerably poorer than this. The yields according to the present process are even better in comparison with those of the prior art when it is recalled that the latter (50-60%) were calculated on the basis of the acid rather than the urea which was used in large excess. The process of this invention gives substantially white products while those disclosed in the previously described processes are black masses requiring extensive purification. The present process avoids such purification and leads to the direct production of the desired products in a high state of purity. The reaction temperatures employed in carrying out the process of the present invention are, in general, lower than those preferably employed in previously known processes. Because of lower ratios of the urea to acid, greater purity of product, and higher yield of product, the present process is more economical than processes previously known.

By the process of this invention it is possible to prepare amides of certain polycarboxylic acids by reaction of the acid with a urea, whereas the prior art has been concerned only with polycarboxylic acids which form imides rather than amides under the conditions of the process. Substituted amides are readily made by the present process while previously it has been known to make such amides only by treatment of acids with amines. Mixtures of amides are readily obtained by this process by carrying out the reaction with unsymmetrical ureas. Amides of diamines are readily obtained by carrying out the reaction with double ureas. The invention makes possible the preparation of many N-alkyl fatty acid amides which have not heretofore been prepared. Among the products which, so far as is known, have not heretofore been described are methyl- and dimethyllauramide, dimethylstearamide, and methyl- and dimethyloleamide.

As many apparently widely different embodiments of this invention may be made without departing from the spirit and scope thereof, it is to be understood that we do not limit ourselves to the specific embodiments thereof except as set forth in the appended claims.

We claim:

1. The process of preparing an acid amide which comprises reacting an acid of the formula $R(COOH)_x$, wherein R is a hydrocarbon radical wherein the carbon atoms attached to carboxyl are aliphatic and $x$ is an integer, with a member of the class consisting of urea and ureas having an $NH_2$ hydrogen replaced by a hydrocarbon radical, at a temperature of at least 130° C. but below the decomposition temperature of the urea, in an amount not substantially greater than $0.6x$ mol. for each mol. of acid, said acid being one whose amide is stable under reaction conditions and whose carboxyls are separated by a chain of at least three carbon atoms, and thereafter isolating the amide.

2. In the process of preparing an acid amide, the step which comprises reacting, at a temperature of at least 130° C. but less than the decomposition temperature of the reactants, a urea (in which any substituents for amido hydrogen are hydrocarbon radicals) with an acid of the formula $R(COOH)_x$, $x$ being an integer and R being a hydrocarbon radical wherein the carbons adjacent to carboxyl are aliphatic in character, said acid being further characterized in that when $x$ is greater than one the carboxyls are separated by a chain of at least three carbon atoms, and said urea being employed in the reaction in an amount not exceeding about $0.6x$ mol. per mol. of acid.

3. The process of preparing an acid amide which comprises reacting an acid of the formula $R(COOH)_x$, wherein R is a hydrocarbon radical wherein the carbon atoms attached to carboxyl are aliphatic and $x$ is an integer greater than one, with a member of the class consisting of urea and ureas having an $NH_2$ hydrogen replaced by a hydrocarbon radical, at a temperature of at least 130° C. but below the decomposition temperature of the urea, in an amount not substantially greater than $0.6x$ mol. for each mol. of acid, said acid being one whose amide is stable under reaction conditions and whose carboxyls are separated by a chain of at least three carbon atoms and thereafter isolating the amide.

4. The process of preparing an acid amide which comprises reacting an acid of the formula $R(COOH)_2$ wherein R is a hydrocarbon radical wherein the carbon atoms attached to carboxyl are aliphatic, with a member of the class consisting of urea and ureas having an $NH_2$ hydrogen replaced by a hydrocarbon radical, in an amount not substantially greater than 1.2 mols of the urea for each mol. of the acid, said acid being one whose amide is stable under reaction conditions and whose carboxyls are separated by a chain of at least three carbon atoms, and thereafter isolating the amide.

5. The process of preparing an acid amide which comprises reacting an acid of the formula $HOOC(CH_2)_nCOOH$, where $n$ has a value of at least 3, with a member of the class consisting of urea and ureas having an $NH_2$ hydrogen replaced by a hydrocarbon radical, in an amount not substantially greater than 1.2 mols of the urea for each mol. of the acid and isolating the amide.

6. The process of preparing an acid amide which comprises reacting an acid of the formula $HOOC(CH_2)_nCOOH$, where $n$ is at least 3, with urea.

7. The process of preparing an acid amide which comprises reacting an acid of the formula $RCOOH$, wherein R is a hydrocarbon radical wherein the carbon atom attached to the carboxyl is aliphatic, with a member of the class consisting of urea and ureas having an $NH_2$ hydrogen replaced by a hydrocarbon radical, in an amount not substantially greater than 0.6 mol. of the urea for each mol. of the acid, at a temperature of at least 130° C. but below the decomposition temperature of the urea.

8. The process of preparing an acid amide which comprises reacting an acid of the formula $RCOOH$, wherein R is a saturated aliphatic hydrocarbon radical, with a member of the class consisting of urea and ureas having an $NH_2$ hydrogen replaced by a hydrocarbon radical, in an amount not substantially greater than 0.6 mol. of the urea for each mol. of the acid, at a temperature of at least 130° C. but below the decomposition temperature of the urea.

9. The process of preparing an acid amide which comprises reacting an acid of the formula $RCOOH$, wherein R is a saturated aliphatic hydrocarbon radical, with a urea having an $NH_2$ hydrogen replaced by a hydrocarbon radical.

10. The process of preparing an acid amide which comprises reacting an acid of the formula $RCOOH$, wherein R is a saturated aliphatic hydrocarbon radical, with urea in an amount not substantially greater than 0.6 mol. for each mol. of the acid at a temperature of at least 130° C. but below the decomposition temperature of the urea.

GAETANO FRANCIS D'ALELIO.
EBENEZER EMMET REID.